(12) United States Patent
Ryan et al.

(10) Patent No.: US 9,175,640 B2
(45) Date of Patent: Nov. 3, 2015

(54) LIQUID PHASE INJECTION TIP ICING PREVENTION

(75) Inventors: Stephen Raymond Ryan, Winchelsea (AU); Brendan John Butcher, Melbourne (AU)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 13/556,116

(22) Filed: Jul. 23, 2012

(65) Prior Publication Data
US 2014/0021272 A1 Jan. 23, 2014

(51) Int. Cl.
*F02M 63/00* (2006.01)
*F02M 21/02* (2006.01)
*F02M 61/14* (2006.01)

(52) U.S. Cl.
CPC ......... *F02M 21/0278* (2013.01); *F02M 21/026* (2013.01); *F02M 21/0212* (2013.01); *F02M 21/0281* (2013.01); *F02M 21/0287* (2013.01); *F02M 21/0296* (2013.01); *F02M 61/145* (2013.01)

(58) Field of Classification Search
CPC ....... F02M 63/00; F02M 21/02; F02M 61/14; F02M 61/16; F02M 21/0278; F02M 21/0212; F02M 21/0287; F02M 21/0296; F02M 21/026; F02M 61/145; B05B 15/065
USPC .............. 239/132.1, 132.3, 132.5, 397.5, 239/DIG. 19, 533.2, DIG. 4, 128, 135, 584; 277/591–598; 123/470, 527, 27 GE, 123/41.31, 294
See application file for complete search history.

(56) References Cited

U.S. PATENT DOCUMENTS

| | | | |
|---|---|---|---|
| 5,291,869 A | 3/1994 | Bennett | |
| 5,361,990 A | 11/1994 | Pimentel | |
| 5,887,574 A | 3/1999 | Smith | |
| 6,412,450 B1 | 7/2002 | Jaasma | |
| 7,182,073 B1 | 2/2007 | Kim | |
| 2012/0138711 A1* | 6/2012 | Song | 239/584 |
| 2013/0233274 A1* | 9/2013 | Caley et al. | 123/294 |
| 2013/0233279 A1* | 9/2013 | Karay | 123/470 |

FOREIGN PATENT DOCUMENTS

| | | |
|---|---|---|
| EP | 0925435 B1 | 9/1997 |
| EP | 0915248 A1 | 5/1999 |
| JP | 2002227726 A | 8/2002 |

(Continued)

OTHER PUBLICATIONS

ISA Korea International Search Report and Written Opinion of PCT/US2013/050150, Oct. 16, 2013, WIPO, 8 pages.

*Primary Examiner* — Stephen K Cronin
*Assistant Examiner* — Xiao Mo
(74) *Attorney, Agent, or Firm* — James Dottavio; Alleman Hall McCoy Russell & Tuttle LLP

(57) ABSTRACT

A fuel injector assembly is provided herein. The fuel injector assembly includes an insulated delivery conduit in fluidic communication with a fuel pump and a conductive enclosure at least partially surrounding the insulated delivery conduit. The fuel injector assembly further includes a seal positioned between the insulated delivery conduit, conductive enclosure, and the fuel injector outlet with radial and axial forces against an exterior surface of the insulated delivery conduit, interior surface of the conductive enclosure, and the exterior surface of fuel injector outlet.

18 Claims, 4 Drawing Sheets

(56) References Cited

FOREIGN PATENT DOCUMENTS

| KR | 100878591 | B1 | * | 1/2009 | ............. F02M 61/14 |
| KR | 20090111398 | A | * | 10/2009 | ............. F02M 21/02 |
| KR | 20120008682 | A | | 2/2012 | |
| WO | 9635863 | | | 11/1996 | |
| WO | 9810184 | | | 3/1998 | |
| WO | 2008004868 | A1 | | 1/2008 | |
| WO | 2012000039 | A1 | | 1/2012 | |

\* cited by examiner

LIQUID PHASE INJECTION TIP ICING PREVENTION

PROBLEM/SOLUTION

Fuel injectors may be positioned in the intake manifold of an engine to provide port fuel injection. However, port fuel injectors may experience low temperatures due to the expansion of fuel in the fuel injector assembly as well as the low temperature of the intake air flowing through the intake manifold. Specifically, engines with fuel injectors configured to inject liquefied gas, such as liquefied petroleum gas (LPG), may experience a large temperature drop in the fuel injector assembly due to the rapid depressurization of the liquefied gas in the fuel injector assembly. Consequently, during some operating conditions ice particles may form on the tip of the fuel injector assembly. Specifically, moisture in the incoming intake air may condense and freeze on the tip of the injector assembly. Additionally, constituents of the fuel may also freeze on the tip of the injector assembly. For example, butane in LPG may remain in a liquid state after injection due to a decrease in temperature caused by the rapid depressurization of the liquefied gas. As a result, condensed moisture in the intake air may freeze on the tip of the fuel injector assembly. The ice on the tip of the fuel injector may cause a disturbance to stable combustion in a cylinder positioned downstream of the fuel injector assembly. In particular, once the engine exceeds a threshold operating temperature and/or disturbances in operation occur, the ice particles may break off or melt and flow into the cylinder, which may cause misfires (e.g., rich limit ignitability misfire event) and combustion disturbances.

U.S. Pat. No. 7,182,073 discloses a fuel injector having a brass tip to reduce the likelihood of ice formation at the outlet of the fuel injector. However, the Inventors have recognized several drawbacks with the fuel injector disclosed in U.S. Pat. No. 7,182,073. For example, when the intake manifold surrounding the fuel injector is below a threshold temperature, an inadequate amount of heat may be transferred to the tip from the engine to prevent ice formation along the length of the injector assembly. As another example, the relative position of the nozzle and the outer casing may shift during operation of the fuel injector, increasing wear on each of the components. Moreover, fuel may leak into interface between the nozzle and the outer casing. As a result, the expansion volume in the fuel injector assembly is increased thereby decreasing the temperature of the fuel due to the relationship between the temperature and volume of the fuel in the injector. Consequently, the likelihood of ice formation at the along the length of the injector assembly may be increased.

In one approach, a fuel injector assembly is provided to at least partially address the above issues. The fuel injector assembly includes an insulated delivery conduit in fluidic communication with a fuel tank and a conductive enclosure at least partially surrounding the insulated delivery conduit. The fuel injector assembly further includes a seal positioned between the insulated delivery conduit and the conductive enclosure exerting an axial and a radial force against an exterior surface of the insulated delivery conduit and an interior surface of the conductive enclosure and against an outlet of a fuel injector body.

The seal reduces the likelihood of fuel leaking into the interface between the delivery conduit and conductive enclosure. Moreover, the seal reduces the expansion volume within the fuel injector assembly. When the expansion volume is reduced, temperature reduction in the fuel travelling through the injector is decreased (due to the relationship between temperature and volume of the fuel in the injector). As a result, the likelihood of ice formation along the length of the conductive enclosure is decreased, thereby decreasing combustion disturbances and therefore improving stable operation of an engine utilizing the fuel injection assembly. Moreover, when the seal is provided in conjunction with the insulated delivery conduit, the likelihood of ice formation along the length of the conductive enclosure is further reduced and in some cases substantially inhibited.

In some examples, the insulated delivery conduit is in fluidic communication with a fuel tank storing LPG. Therefore, the seal and the insulated delivery conduit reduce the likelihood of ice formation along the length of the conductive enclosure caused by the rapid depressurization of the LPG in the fuel injector. As a result, combustion disturbances are avoided.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-4 are drawn approximately to scale, although other relative dimensions may be used, if desired.

DETAILED DESCRIPTION

Example fuel injector assemblies and systems are provided herein. An example fuel injector assembly may include an insulated delivery conduit in fluidic communication with a fuel tank, a conductive enclosure at least partially surrounding the delivery conduit, and a seal positioned between the delivery conduit and the conductive enclosure exerting an axial and a radial force against an exterior surface of the delivery conduit and an interior surface of the conductive enclosure and against outlet of fuel injector body. The seal reduces the expansion volume in the fuel injector assembly, thereby reducing temperature loss in the fuel travelling through the injector assembly. Temperature loss may be particularly problematic in fuel injectors injecting liquefied gas, such as liquefied petroleum gas (LPG), due to the large decrease in pressure across the fuel injector due to the pressurization of the liquefied gas. Therefore, the seal as well as the insulated delivery conduit may work in conjunction to reduce the likelihood of ice formation in this type of injector. Additionally, the seal fixes the relative position of the conductive enclosure and the delivery conduit and reduces the likelihood of fuel leaking into the interface between the conductive enclosure and the delivery conduit.

Figure 1:
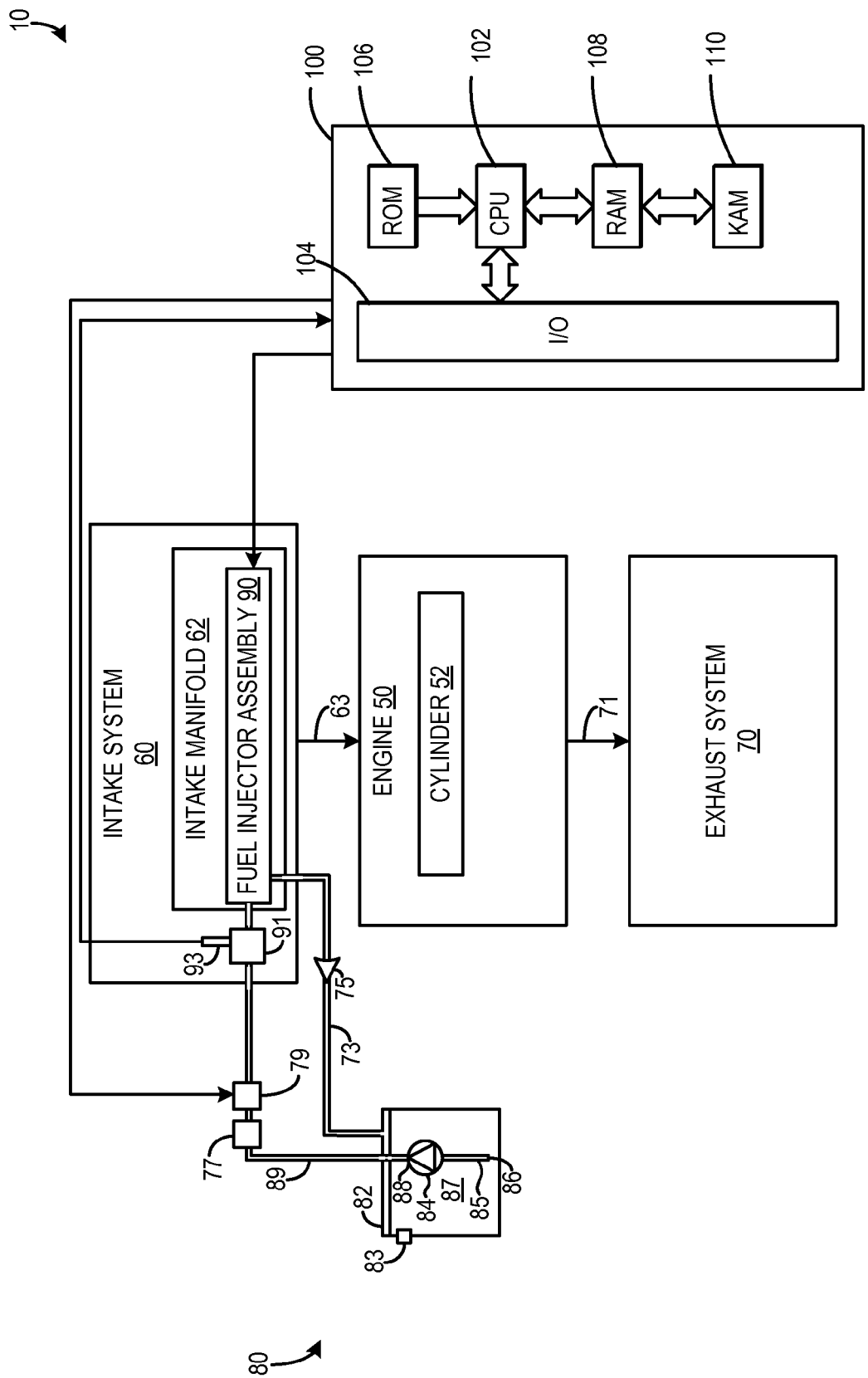
FIG. 1 shows a schematic depiction of a vehicle including an internal combustion engine, intake system, fuel delivery system and exhaust system.

FIG. 1 shows a schematic depiction of a vehicle 10 including an internal combustion engine 50 having at least one cylinder 52. During operation, each cylinder within engine 50, such as cylinder 52, typically undergoes a four stroke cycle: the cycle includes the intake stroke, compression stroke, expansion stroke, and exhaust stroke. The engine 50 may be configured to perform spark ignition in the cylinder 52. However, in other examples, compression ignition may be performed. The vehicle 10 may further include an intake system 60 having an intake manifold 62. The intake system 60 is configured to provide intake air to the cylinder 52. The intake manifold may be in direct fluidic communication with an intake port of the cylinder 52. That is to say that there are no intermediary components between the outlet of the intake manifold and the intake port of the cylinder 52. Arrow 63 denotes the flow of intake air and/or fuel from the intake system 60 to the cylinder 52.

The vehicle 10 further includes an exhaust system 70. The exhaust system 70 is configured to receive exhaust gas from the engine 50. Arrow 71 denotes the flow of exhaust gases from the cylinder 52 to the exhaust system 70. The exhaust system 70 may include a number of components such as an exhaust conduit, an emission control device (e.g., catalyst, filter, etc.), a noise suppression device (e.g., muffler), etc. It will be appreciated that the exhaust system 70 receives exhaust gas from the cylinder 52 and expels the gas into the surrounding environment.

The vehicle 10 further includes a fuel delivery system 80. The fuel delivery system 80 includes a fuel tank 82. The fuel tank may store a liquefied gas under a pressure greater than the atmospheric pressure, in some examples. The liquefied gas may be liquefied petroleum gas (LPG), a liquefied natural gas (LNG), or a liquefied hydrogen. However, in other examples, the fuel tank may be configured to store a fuel such as gasoline, diesel, bio-diesel, alcohol (e.g., methanol, ethanol), or a combination thereof. Thus, the fuel delivery system 80 may be a liquid phase fuel injection system. A filler valve 83, such as a check valve, may be coupled to the fuel tank 82. The filler valve 83 is configured to enable fuel (e.g., pressurized fuel such as liquefied gas) to flow into the fuel tank and inhibit fuel from flowing out of the tank.

The fuel delivery system 80 further includes a fuel pump 84 having a pick-up tube 85 positioned in the fuel tank 82. A controller 100, discussed in greater detail herein, may be electronically coupled to the fuel pump 84. The pick-up tube 85 has an inlet 86 opening into the fuel 87 in the fuel tank 82. The fuel pump 84 is configured to flow fuel to downstream components in the fuel delivery system, in some embodiments. The fuel pump 84 includes an outlet 88 in fluidic communication with a fuel delivery conduit 89. When liquefied gas is stored in the fuel tank 82, the fuel pump 84 may be omitted from the fuel delivery system 80 due to the pressurization of the fuel in the fuel tank. A filter 77 may be coupled to the fuel delivery conduit 89. The filter 77 may be configured to remove particulates from the fuel flowing through the fuel delivery conduit 89. A shut-off valve 79 may also be coupled to the fuel delivery conduit 89. The shut-off valve 79 may be configured to enable and inhibit fuel flow, such as the flow of liquefied gas, through the fuel delivery conduit 89. Controller 100 is electronically coupled to the shut-off valve 79 and configured to control the shut-off valve. However, in other embodiments the shut-off valve may be passively controlled.

The fuel delivery conduit 89 is in fluidic communication with a fuel rail generically denoted via box 91. The fuel rail 91 may be configured to contain a liquefied gas. Thus, the pressure of the liquefied gas in the fuel rail may be greater than the atmospheric pressure. A pressure sensor 93 may be coupled to the fuel rail 91. The pressure sensor 93 is in electronic communication with controller 100. A temperature sensor may also be coupled to the fuel rail in some embodiments. Furthermore, the fuel rail 91 is in fluidic communication with the fuel injector assembly 90. Thus, fuel may flow from the fuel tank to the fuel rail and from the fuel rail to the fuel injector assembly. It will be appreciated that the fuel rail 91 may be in fluidic communication with a plurality of fuel injector assemblies. A return fuel line 73 may be in fluidic communication with the fuel injector assembly 90 and the fuel tank 82. Arrow 75 denotes the general direction of flow through the return fuel line 75. The return fuel line 73 may be configured to flow fuel back to the fuel tank from the fuel injector during certain operating conditions, such as when the fuel pressure in the fuel injector assembly 90 surpasses a predetermined threshold value. The fuel injector assembly 90 may be a port fuel injector. A port fuel injector as defined herein is a fuel injector positioned at least partially upstream of an intake port in the intake system of an internal combustion engine. The fuel injector assembly 90 is positioned in the intake manifold 62, providing what is referred to as port fuel injection. It will be appreciated that the intake manifold 62 and therefore the fuel injector assembly 90 is positioned upstream of the cylinder 52. The fuel injector assembly 90 may include a number of features that decrease the likelihood of ice formation at the outlet of the injector, discussed in greater detail herein with regard to FIGS. 2-4.

In one example, the injector assembly 90 is configured for liquid phase injection of a liquid gas such as liquid petroleum gas (LPG), liquefied natural gas (LNG), and/or liquefied hydrogen gas. As previously discussed, the aforementioned gases may be stored in the fuel tank 82 at a pressure greater than the atmospheric pressure. It will be appreciated that the LPG may include propane and/or butane, amongst other constituents. When LPG is flowed through the injector assembly 90, a large pressure drop occurs in the fuel due to the pressurized storage of the LPG. The injector assembly may have various features to reduce the likelihood of ice formation along the length of the conductive enclosure 220, shown in FIG. 2, caused by the large pressure drop in the injector assembly, discussed in greater detail herein.

In other embodiments, the fuel delivery system 80 may further include a mixer positioned downstream of the injector assembly 90. Further in other embodiments, the fuel delivery system 80 may further include a second fuel tank. The second fuel tank may be configured to store a different fuel than the first fuel tank. In some embodiments, the second fuel tank may be configured to store a fuel such as diesel, bio-diesel, gasoline, and/or alcohol (e.g., ethanol, methanol). If diesel is stored in the second fuel tank the engine may be configured to perform compression ignition. When a second fuel tank is included in the engine fuel from both fuel tanks may be injected into the intake system, if desired. It will be appreciated that the pressure of the fuel in the second fuel tank may not exceed atmospheric pressure, in some examples. Thus, the fuel in the second fuel tank may not be pressurized in some embodiments. However, in other embodiments the fuel in the second fuel tank may be pressurized.

Controller 100 is shown in FIG. 1 as a microcomputer including: microprocessor unit 102, input/output ports 104, read-only memory 106, random access memory 108, keep alive memory 110, and a conventional data bus. The controller 100 may be configured to send control signals to adjust various components (e.g., shut-off valve 79, fuel pump 84, and fuel injector assembly 90). Furthermore, the controller 100 may be configured to receive signals from sensors (e.g., pressure sensor 93) or other components in the vehicle 10, such as temperature sensors, oxygen sensors, pressure sensors, etc.

Figure 2:
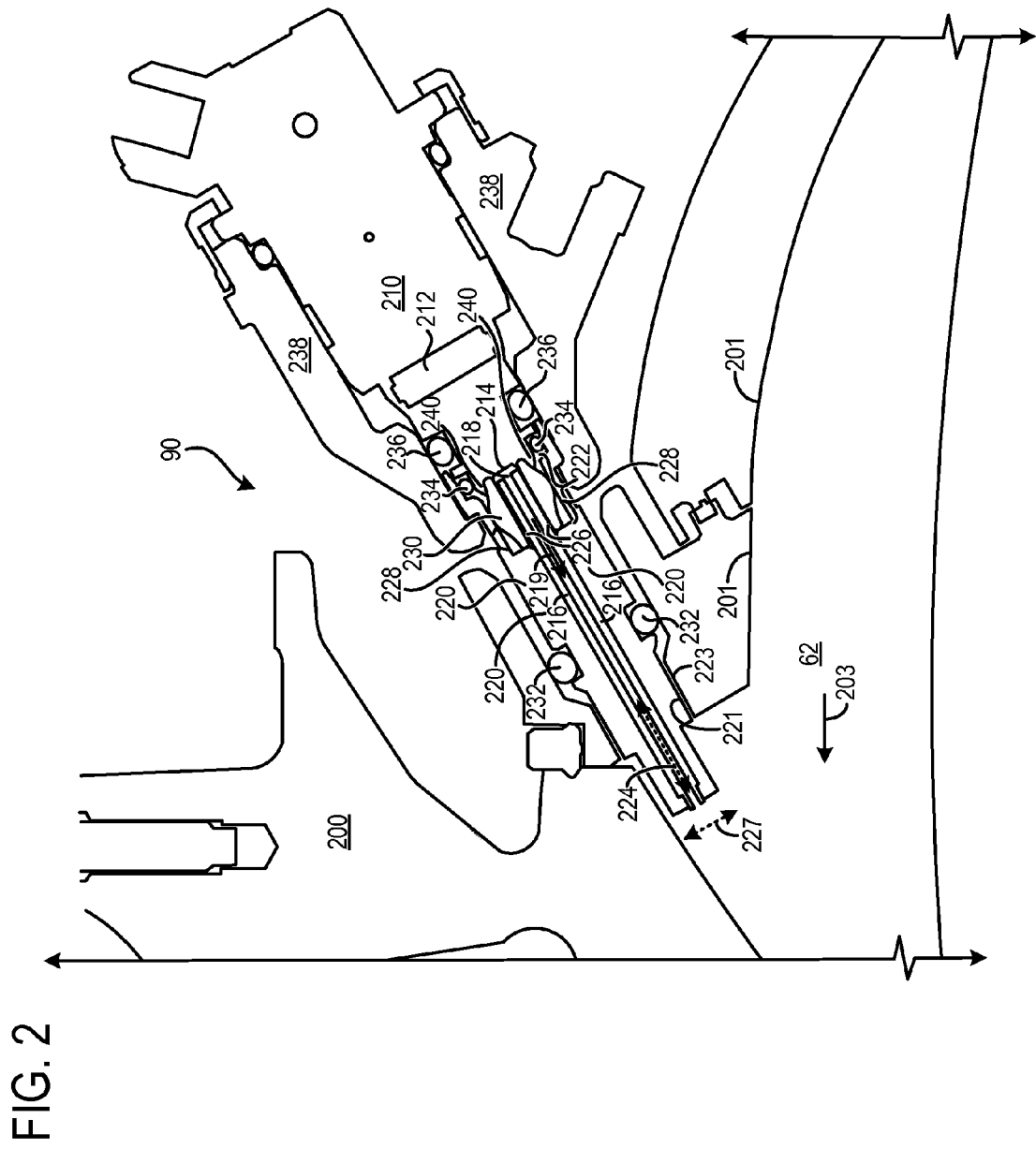
FIG. 2 shows a cross-sectional view of an example cylinder head, intake manifold, and fuel injector assembly extending into the intake manifold.

FIG. 2 shows a cross-sectional view of an example fuel injector assembly 90 and intake manifold 62. The intake manifold 62 includes a housing 201 coupled to a cylinder head 200. An intake port (not shown) in direct fluidic communication with the cylinder 52, shown in FIG. 1, may also be included in the cylinder head 200. The intake manifold 62 may be coupled to the cylinder head 200 via a suitable coupling apparatus, such as bolts, screws, etc. Arrow 203 denotes the general flow of intake air through the intake manifold 62. However, it will be appreciated that the intake air flow pattern may have additional complexity that is not depicted. An intake valve (not shown) may also be positioned in the cylinder head 200. The intake valve is configured to enable and inhibit intake air and fuel from flowing into the cylinder 52, shown in FIG. 1.

The cylinder head 200 may be constructed out of aluminum, magnesium, etc. The intake manifold 62 may be constructed out of a different material than the cylinder head 200. For example, the intake manifold 62 may be constructed out of a polymeric material and the cylinder head 200 may be constructed out of aluminum. However, in some embodiments the cylinder head 200 and the intake manifold 62 may be constructed out of similar materials. Other exemplary materials used to construct the intake manifold may include steel, aluminum.

The fuel injector assembly 90 includes a fuel injector body 210. The fuel injector body 210 includes an inlet 212. The inlet 212 may be in fluidic communication with the fuel tank 82, shown in FIG. 1. Further in some embodiments, the inlet 212 may be in fluidic communication with a fuel rail 238.

The fuel injector body 210 further includes an outlet 214. The fuel injector body 210 may include additional components such as solenoids configured to enable and inhibit fuel flow through the fuel injector assembly 90. Example components of fuel injector include electrical connector, solenoid, needle, seat, and/or orifice. The solenoids may be electronically controlled via the controller 100, shown FIG. 1. The fuel injector body 210 is coupled to a delivery conduit 216 included in the fuel injector assembly 90. In the depicted the insulated delivery conduit is in the shape of a tube. However, other delivery conduit geometries have been contemplated. The delivery conduit 216 includes an inlet 218 in direct fluidic communication with the outlet 214 of the fuel injector body 210. Arrow 219 denotes the general flow of fuel (e.g., liquefied gas) through the delivery conduit 216. Therefore, downstream is in the direction of the arrow 219 and upstream is in the opposite direction.

The fuel injector assembly 90 further includes a conductive enclosure 220. The conductive enclosure may at least partially surround the insulated delivery conduit 216. In particular the conductive enclosure 220 extends 360 degrees around the delivery conduit 216. Thus, the conductive enclosure 220 is contiguous. However, other conductive enclosure configurations have been contemplated. In some examples, the ratio between the diameter of the delivery conduit 216 and the conductive enclosure 220 may be 1:3. It will be appreciated that when the ratio between the diameters of the delivery conduit and the conductive enclosure is 1:3, the insulation provided to the fuel (e.g., liquefied gas) flowing through the conduit is increased while retaining conductive heat transfer characteristics when the intake manifold 62 has surpassed the temperature of the fuel when compared to fuel injectors which are not insulated. In this way, the likelihood of ice formation along the length of the conductive enclosure is reduced, thereby minimizing combustion disturbances in the cylinder. Additionally, the conductive enclosure 220 extends into the intake manifold 62 along with the insulated delivery conduit 216. An outer surface 221 of the conductive enclosure 220 is partially separated from a surface 223 of the housing 201 of the intake manifold 62. However, in other examples the outer surface 221 may be in face sharing contact with surface 223.

A recess 222 is also shown in the fuel injector assembly 90. The recess 222 extends in an axial downstream direction. Therefore, the recess 222 extends between the delivery conduit 216 and the conductive enclosure 220 and the injector outlet 214. Axial refers to the central axis 224 of the delivery conduit 216. The boundary of the recess 222 is defined by surfaces of the delivery conduit 216 and the conductive enclosure 220 and against the outlet 214 of fuel injector body, discussed in greater detail herein with regard to FIG. 3.

A seal 230 may be positioned in the recess 222. In the depicted embodiment, the seal is contiguous and extends 360 degrees around the delivery conduit 216. Therefore, the seal 230 is positioned between the conductive enclosure 220 and against the outlet 214 of fuel injector body and the delivery conduit 216 and adjacent to the inlet 218. The seal 230 may be configured to exert an axial and a radial force on both the exterior surface 226 of the delivery conduit 216 and the interior surface 228 of the conductive enclosure 220 and against outlet 214 of fuel injector body. A radial axis 227 is provided for reference. In this way, the relative position of the delivery conduit and the conductive enclosure may be substantially fixed. The seal 230 also reduces the likelihood of fuel leaking into the interface between the delivery conduit 216 and the conductive enclosure 220. In the depicted embodiment the seal 230 is tapered in both an upstream and a downstream direction. However, other suitable seal geometries have been contemplated. As shown in the embodiment depicted in FIG. 2 the seal 230 extends in an axial upstream direction past the inlet 218, when uncompressed. When the seal 230 is compressed it does not extend in an axial upstream direction past the inlet 218 and the expansion volume in the recess 222 is reduced.

The fuel injector assembly 90 further includes a first o-ring 232 positioned between the conductive enclosure 220 and the intake manifold 62. The first o-ring 232 provides sealing between the conductive enclosure 220 and the intake manifold. Moreover, the relative movement between the conductive enclosure 220 and the intake manifold 62 is reduced when the first o-ring is utilized. Although an o-ring is shown it will be appreciated that another suitable type of seal may be used in other embodiments. A second o-ring 234 may be positioned between the fuel injector body 210 and the conductive enclosure 220. Additionally, a third o-ring 236 is positioned between the fuel injector body 210 and a fuel rail body 238.

The delivery conduit 216 may be constructed out of a non-heat conducting material such as Polytetrafluoroethylene (PTFE) (e.g., Teflon®), Nylon (e.g., PA6, PA66), Ceramic, etc. Additionally, the conductive enclosure 220 may be constructed out of a heat conducting material such as brass, steel, aluminum, copper, etc. Furthermore, the seal 230 may be constructed out of a flexible rubber material such as Huor-silicone rubber (FMQ), Fluorcarbon rubber (Viton-FKM), etc.

The fuel injector body 210 includes contiguous protrusions 240 which are in direct contact with the seal 230. The protrusions 240 further decrease the likelihood of fuel leaking from the interface between the outlet 214 of the fuel injector body and the inlet of the delivery conduit 218.

It will be appreciated that the fuel injector assembly 90 may be electromagnetically controlled via the controller 100, shown in FIG. 1. Thus, solenoids may be used to open and close the fuel injector assembly to provide desired fuel metering at desired time intervals. However, other types of control have been contemplated. For example, hydraulic or pneumatic controls may be utilized.

Figure 3:
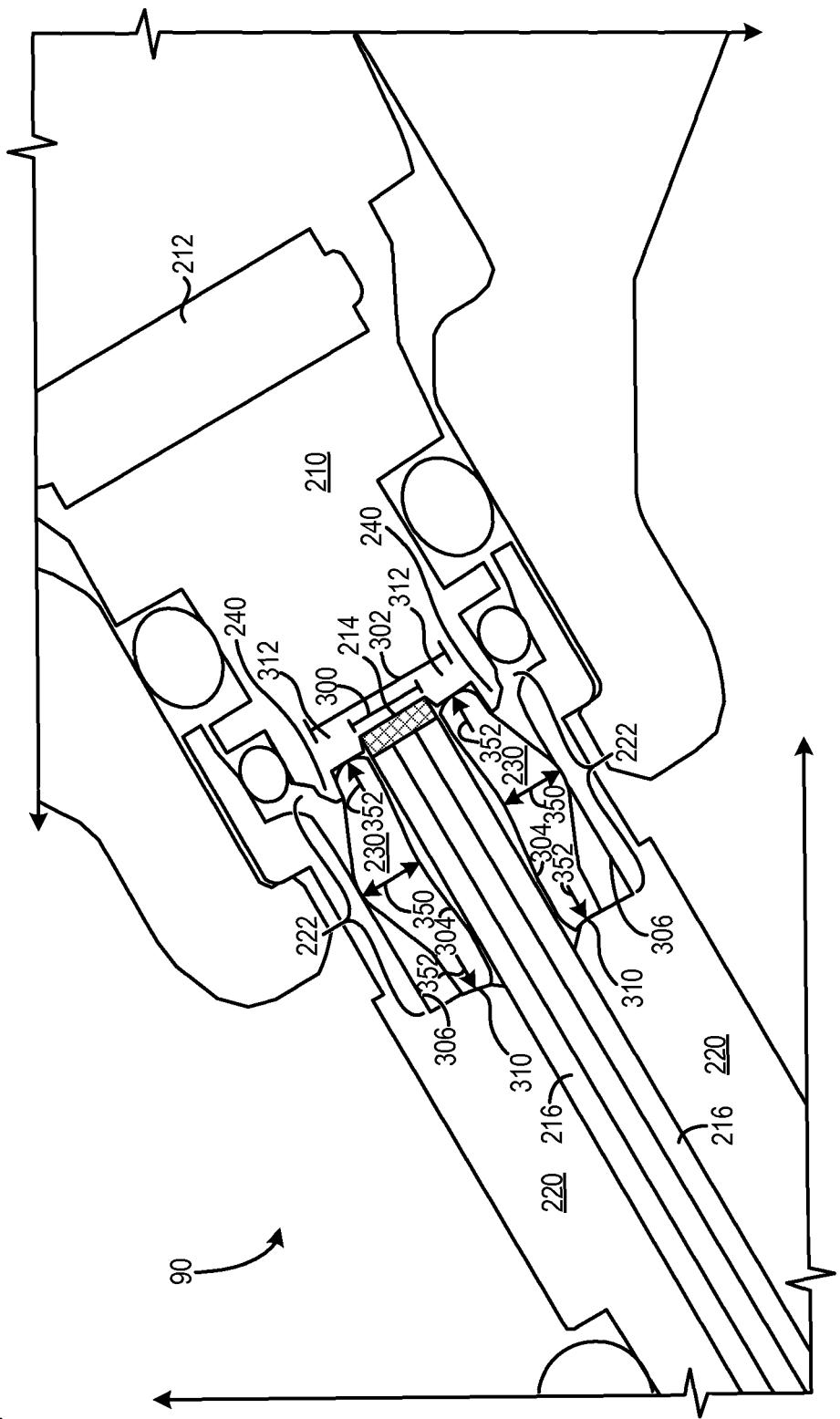
FIG. 3 shows a magnified view of a portion of the fuel injector assembly shown in FIG. 2.

FIG. 3 shows an expanded view of a portion of the fuel injector assembly 90 shown in FIG. 2. The seal 230 positioned in the recess 222 is shown in FIG. 3. At least a portion of the boundary of the recess 222 is defined by an exterior surface 304 of the delivery conduit 216 and an interior surface 306 of the conductive enclosure 220 and outlet 214 and contiguous protrusion 240. As shown, a portion of the interior surface 306 downstream of the recess 222 is in face sharing contact with a portion the exterior surface 304. Additionally FIG. 3 shows the width (e.g. diameter) 300 of the delivery conduit 216 being less than the width (e.g., diameter) 302 of the seal 230. In this way, robust sealing may be provided between the conductive enclosure 220 and delivery conduit 216 as well as the injector body 210. Additionally, the seal 230 tapers in an upstream and downstream direction. That is to say that the width (e.g., diameter) of the seal 230 decreases in the direction of the first end 310 of the seal and the second end 312 of the seal. Arrows 350 denote the inward and outward radial forces exerted on the delivery conduit 216 and conductive enclosure 220 respectively, by the seal 230. Arrows 352 depict the axial forces exerted by the seal 230.

Figure 4:
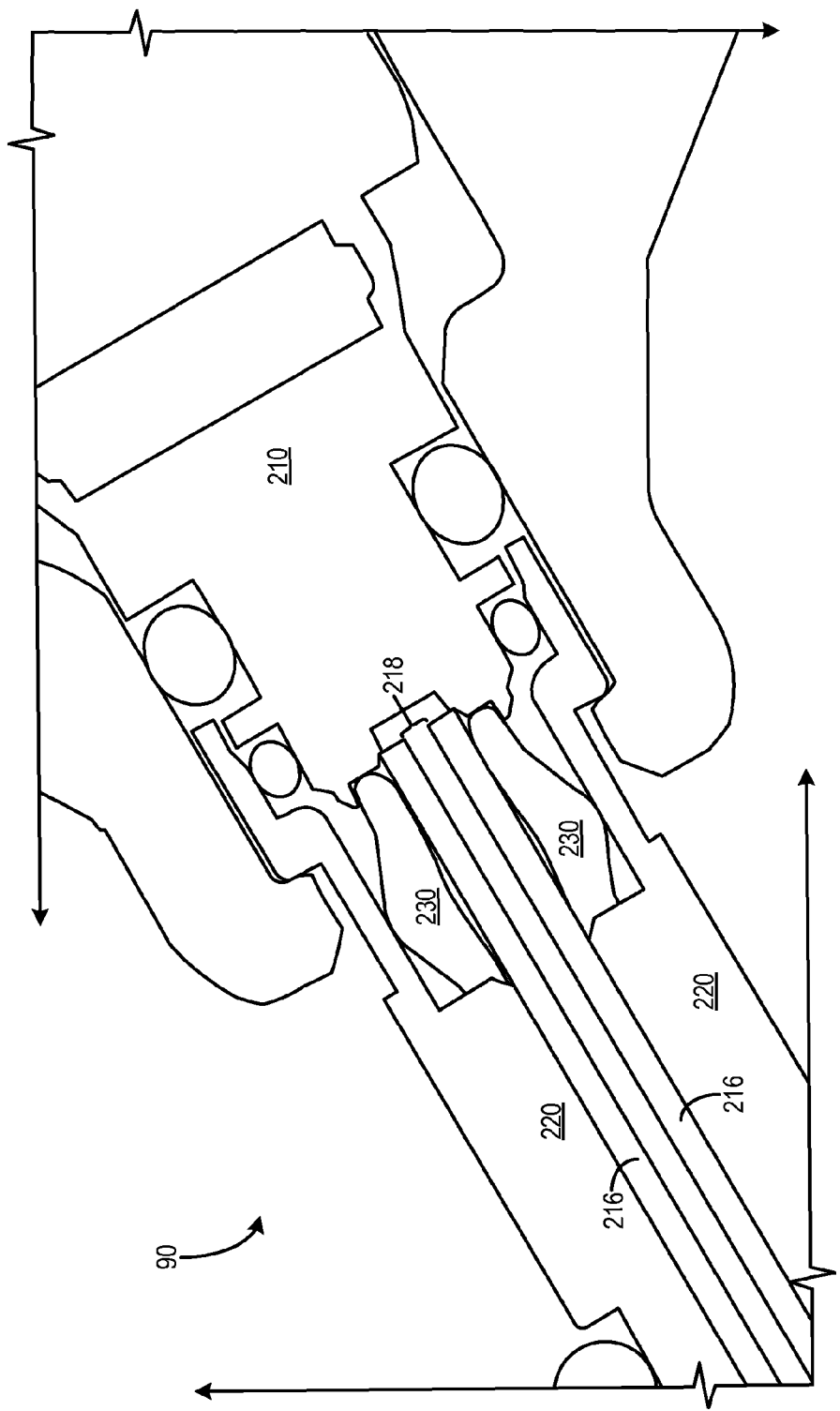
FIG. 4 shows a second embodiment of the fuel injector assembly.

FIG. 4 shows an embodiment of the fuel injector assembly 90 in which the seal 230 is compressed. The embodiment shown in FIG. 4 includes many components similar to the embodiment of the fuel injector assembly 90, shown in FIGS. 2 and 3. Therefore, similar parts are labeled accordingly. As shown, the seal 230 in FIG. 4 does not extend upstream beyond the inlet 218 of the insulated delivery conduit 216. However, other geometries and positions of the seal have been contemplated. The conductive enclosure 220, delivery conduit 216, and fuel injector body 210 are also shown in FIG. 4.

This concludes the description. The reading of it by those skilled in the art would bring to mind many alterations and modifications without departing from the spirit and the scope of the description. For example, single cylinder, inline engines, V-engines, and horizontally opposed engines operating in natural gas, gasoline, diesel, or alternative fuel configurations could use the present description to advantage.

The invention claimed is:

1. A fuel injector assembly comprising:
   an insulated delivery conduit fluidically communicating with a fuel tank;
   a conductive enclosure at least partially surrounding the conduit; and
   a seal positioned adjacent to an inlet of the insulated delivery conduit and between the conduit, the conductive enclosure and a fuel injector outlet exerting axial and radial forces against an exterior surface of the conduit and an interior surface of the conductive enclosure and the fuel injector outlet, the seal tapering in a downstream direction and an upstream direction, and the seal extending in an axial upstream direction past the inlet of the insulated delivery conduit when uncompressed, and the seal not extending in the axial upstream direction past the inlet when compressed.

2. The fuel injector assembly of claim 1, where the fuel tank stores liquefied gas, and the liquefied gas is liquefied petroleum gas (LPG) or liquefied natural gas (LNG).

3. The fuel injector assembly of claim 1, where the seal is positioned in a recess extending between the insulated delivery conduit and the conductive enclosure and the fuel injector outlet.

4. The fuel injector assembly of claim 3, where the recess extends in an axial direction.

5. The fuel injector assembly of claim 1, where the insulated delivery conduit comprises a non-heat conducting material comprising at least one of Polytetrafluoroethylene (PTFE), nylon, and a ceramic material.

6. The fuel injector assembly of claim 1, where the conductive enclosure comprises a heat conducting material including at least one of brass, steel, aluminum, and copper.

7. The fuel injector assembly of claim 1, where the seal comprises a flexible polymeric material.

8. The fuel injector assembly of claim 1, where an outer surface of the conductive enclosure is partially separated from a surface of a housing of an intake manifold in fluidic communication with an intake port of a cylinder in an engine.

9. The fuel injector assembly of claim 8, where the intake manifold comprises at least one of a polymeric material and a nylon material.

10. The fuel injector assembly of claim 1, where the seal exerts a radial and axial force on a protrusion of a fuel injector body including an outlet in direct fluidic communication with an inlet of the insulated delivery conduit.

11. The fuel injector assembly of claim 1, where the fuel injector assembly is positioned upstream of an intake port of a cylinder in an engine.

12. A fuel injector assembly comprising:
   an insulated delivery conduit in fluidic communication with a fuel tank storing a liquefied gas;
   a conductive enclosure at least partially surrounding the insulated delivery conduit;
   a contiguous seal positioned between the insulated delivery conduit and the conductive enclosure and a fuel injector outlet exerting axial and radial forces against an exterior surface of the insulated delivery conduit and an interior surface of the conductive enclosure, wherein the seal tapers in a direction of a first end of the seal and of a second end of the seal, wherein the seal has a first side with a convex portion, the convex portion between the tapering first end and the tapering second end, and a second side coupling the conduit along a longitudinal length of the conduit, the second side having a concave portion; and
   a fuel injector body coupled to the insulated delivery conduit, the fuel injector body including an outlet in direct fluidic communication with an inlet of the insulated delivery conduit.

13. The fuel injector assembly of claim 12, where a width of the inlet of the insulated delivery conduit is less than a width of the contiguous seal.

14. The fuel injector of claim 12, where a pressure of the liquefied gas in the fuel tank is greater than atmospheric pressure.

15. The fuel injector of claim 12, where the liquefied gas is liquefied petroleum gas (LPG).

16. A port fuel injector assembly comprising:
   an insulated delivery conduit having an inlet in fluidic communication with a fuel pump having a pick-up tube positioned in a fuel tank storing liquefied petroleum gas (LPG);
   a conductive enclosure at least partially surrounding the insulated delivery conduit and including an interior surface in face sharing contact with an exterior surface of the insulated delivery conduit; and a seal positioned in a recess extending between the insulated delivery conduit and the conductive enclosure at an upstream end of the insulated delivery conduit and conductive enclosure, the seal exerting axial and radial forces on a protrusion of a fuel injector body and against an exterior surface of the insulated delivery conduit and an interior surface of the conductive enclosure, wherein the fuel injector body includes an outlet in direct fluidic communication with the inlet of the insulated delivery conduit, and wherein the seal tapers in a downstream direction and an upstream direction, and wherein the seal extends in an axial upstream direction past the inlet of the insulated delivery conduit when uncompressed, and wherein the seal does not extend in the axial upstream direction past the inlet when compressed.

17. The port fuel injector assembly of claim 16, wherein the insulated delivery conduit and conductive enclosure extend into an intake manifold, wherein the port fuel injector is coupled directly in an intake manifold housing, and wherein the intake manifold is coupled directly to an aluminum cylinder head.

18. The port fuel injector assembly of claim 16, wherein a width of the seal decreases in a direction of a first end of the seal and in a direction of a second end of the seal.

\* \* \* \* \*